Oct. 6, 1959 W. CLAYTON Re. 24,717

ENGINE EXHAUST GAS AFTERBURNER

Original Filed Sept. 30, 1955 2 Sheets-Sheet 1

INVENTOR

*William Clayton*

BY *Baldwin & Lewis*

ENGINE EXHAUST GAS AFTERBURNER

Original Filed Sept. 30, 1955 2 Sheets-Sheet 2

INVENTOR
William Clayton
BY Bakelar & Lewis

United States Patent Office

Re. 24,717
Reissued Oct. 6, 1959

24,717

ENGINE EXHAUST GAS AFTERBURNER

William Clayton, Pasadena, Calif., by Barkelew Manufacturing Co., Alhambra, Calif, assignee, assignor, by mesne assignments, to Barkelew Manufacturing Company, Los Angeles, Calif., a corporation of California

Original No. 2,806,346, dated September 17, 1957, Serial No. 537,798, September 30, 1955. Application for reissue June 12, 1959, Serial No. 820,570

11 Claims. (Cl. 60—30)

Matter enclosed in heavy brackets [ ] appears in the original patent but forms no part of this reissue specification; matter printed in italics indicates the additions made by reissue.

The present invention relates to certain improvements in a combined muffler and exhaust gas afterburner of the character disclosed in my copending application, Ser. No. 476,137, *now Patent No. 2,829,731 issued April 8, 1958.*

Under certain engine operating conditions, and particularly under prolonged idling, it is difficult to maintain a spontaneous pilot flame that will assure combustion of the unburned hydrocarbons in the exhaust gases before they are discharged to the atmosphere and pollute the same. In order to prevent the discharge of such unburned hydrocarbons into the atmosphere and to alleviate objectionable "smog" conditions, the present invention contemplates the use of a spark plug mounted in the afterburner section of the muffler which will at all times assure positive ignition of the unburned gases without involving any danger of muffler explosion in the event that the engine is restarted immediately after having been stopped, or while the muffler otherwise contains a mixture that would create an explosion hazard.

The present invention further embodies a time-delay switch associated with the engine ignition circuit and with the circuit of the muffler spark plug for positively avoiding explosions in the muffler that might otherwise result upon starting the engine immediately after an explosive mixture of gases has accumulated therein. The function of the time-delay switch is to delay energization of the muffler spark plug for a short time interval, say 7 to 10 seconds, to permit the exhaust gases discharging from the engine to purge the muffler and afterburner sections before an ignition spark is initiated in the muffler.

Accordingly, the principal object of the invention is to provide a muffler construction which will insure substantially complete combustion of all of the combustible constituents in the exhaust gases of an engine before discharge to the atmosphere.

Another object is to provide an afterburner type of muffler wherein the possibility of an explosion that would destroy the muffler is eliminated.

A further object is to provide a circuit for controlling the spark ignition of gases in the afterburner section of a muffler so that the initiation of a spark is delayed for a predetermined time interval after starting of the engine.

Another object is to provide a control means for spark ignition of muffler gases which is associated with the engine ignition system in a manner to render the control of the muffler ignition completely automatic.

The foregoing and other objects of the invention will be apparent from the following description taken in conjunction with the accompanying drawings, in which.

Figure 1:
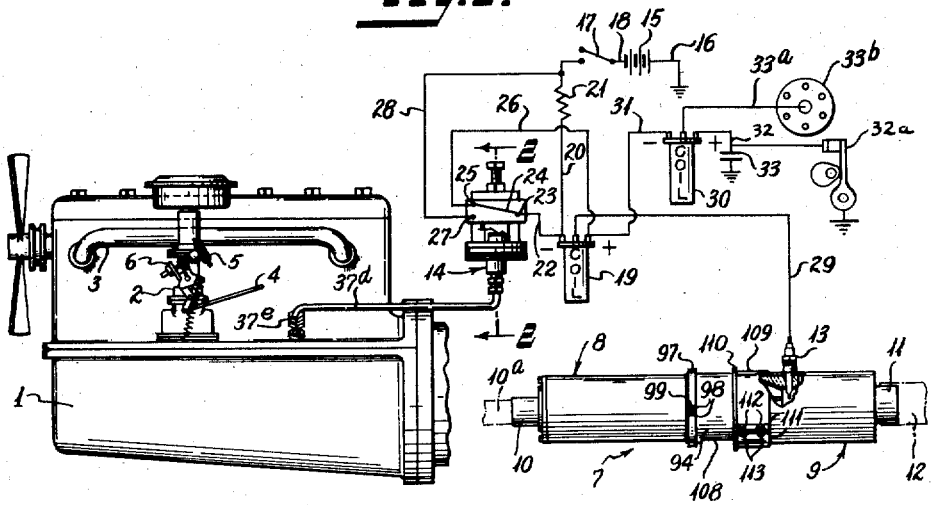
Fig. 1 is a diagrammatic view illustrating an internal combustion engine having associated therewith an afterburner muffler and muffler spark plug control circuit embodying the principles of the present invention.

Referring now to Fig. 1, the numeral 1 generally identifies a conventional internal combustion engine provided with a conventional high pressure oil lubricating system. The engine 1 is controlled by a conventional carburetor 2 connected with the usual intake manifold 3. The carburetor throttle is controlled by the usual linkage 4. A conventional dash pot 5 is mounted upon the carburetor 2 on a bracket 6 and functions to control the return of the carburetor throttle to idling position at a predetermined rate and thereby, upon deceleration, avoids the presence of unburned hydrocarbons in the exhaust gases in a volume greater than the afterburner section of the muffler is capable of consuming the same, as will be pointed out more fully hereinafter.

The numeral 7 generally identifies a muffler section 8 for deadening the engine explosions and an afterburner section 9 for destroying any unburned hydrocarbons present in the exhaust gases. The muffler section 8 has an inlet 10 which is connected to the exhaust manifold (not shown) of the engine 1. The afterburner section 9 has an outlet 11 which is connected to a tail pipe 12. A spark plug 13 is mounted in the afterburner section 9.

Automatic control of the spark plug 13 is effected by connecting the same in the engine ignition system, subject to further automatic control by a time-delay switch 14, which is responsive to a predetermined oil pressure in the engine lubricating system, the switch being arranged so that the ignition circuit to the plug 13 is not completed until after the engine has been in operation for a short period and sufficient oil pressure has been developed in the lubricating system to effect actuation of the switch 14 from one position to another, all as will be set forth more fully hereinafter.

Referring particularly to Fig. 1, a battery 15 is grounded by a conductor 16. An engine ignition control switch 17 is connected by a conductor 18, with the battery 15. A muffler spark plug ignition coil 19 has its negative terminal connected by a conductor 20 to one side of the ignition switch 17. A resistance 21 is preferably connected in series in the conductor 20 to insure a proper potential for the engine ignition coil. The negative side of the coil 19 is connected by a lead 22 with one terminal 23 of the pressure-responsive switch 14. A switch arm 24 establishes a connection between the switch terminal 23 and one contact 25 of the switch 14. A conductor 26 connects the contact 25 with the positive terminal of the coil 19. The switch 14 has a second contact 27 that is connected by a conductor 28 to the conductor 20 at a point between the ignition switch 17 and the resistance 21. The central terminal of the coil 19 is connected by a conductor 29 to the spark plug 13. An engine ignition coil 30 has the negative terminal thereof connected by conductor 31 to the positive terminal of the coil 19, and the positive terminal of the coil 30 is connected by a conductor 32 to ground through the usual circuit breaker 32a, paralleled by the usual grounded condenser 33. A conductor 33a connects the central terminal of the engine ignition coil 30 with a conventional distributor 33b.

Figure 2:
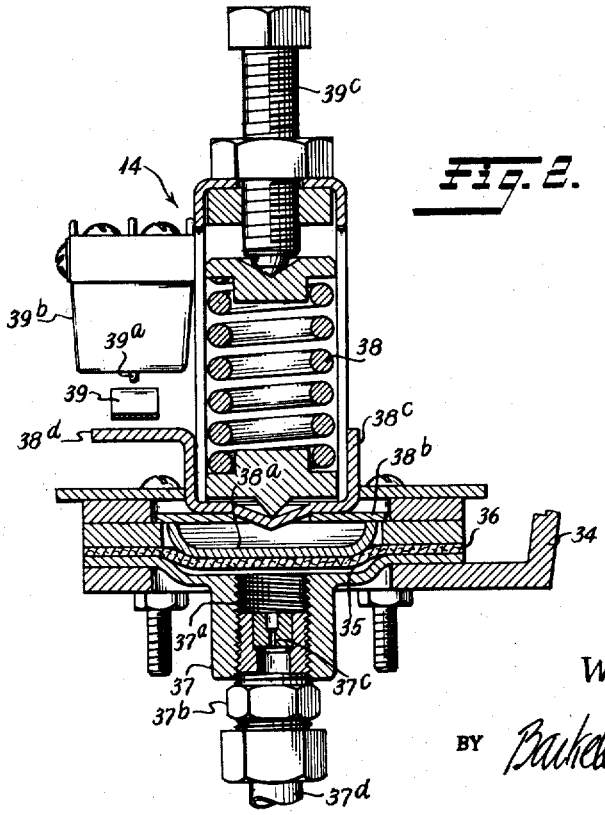
Fig. 2 is a vertical sectional view taken on the line 2—2 of Fig. 1 through the time delay switch that controls energization of the muffler spark plug.

Referring to Fig. 2, the pressure switch 14 is of conventional construction and, therefore, will not be described in extensive detail. A bracket 34 is connected with the housing structure of the pressure responsive portion of the switch for convenience in mounting the same upon any convenient portion of the engine or vehicle. A pressure chamber 35 is formed in the housing between a diaphragm 36 and a cover member 37. The cover member 37 has an inlet 37a in which a conventional fitting 37b is mounted and contains a plug having an orifice 37c of predetermined size, for example, .018 inch in diameter. The fitting 37b is connected by a conduit 37d to a fitting 37e mounted on the engine block and through which oil from the high pressure lubricating system of the engine flows into the conduit 37d. The orifice 37c restricts the rate at which oil can flow into the chamber 35 to act upon the diaphragm 36 and flex the same upwardly. When sufficient pressure is built up in the chamber 35 to overcome the force of the spring 38, elements 38a, 38b, and 38c are raised bodily so that an arm 38d projecting from the element 38c can actuate a spring arm 39 into engagement with a pin 39a of a conventional microswitch 39b. The switch 39b contains the arm 24 and the contacts 25 and 27 previously referred to. The pressure at which the switch 39b may be actuated can be adjusted by the screw 39c to thus vary the force necessary to compress the spring 38.

In practice, the switch 14 is adjusted to move arm 24 to engage contact 27 and energize the ignition coil 19 when the high pressure oil system is operating at minimum pressure; that is to say, at idling speed and after the engine has reached normal operating temperature. The preferred switch adjustment is such that it will be actuated to complete the circuit to the muffler spark plug 13 in approximately 7 to 10 seconds after the engine has been started. It will be understood, of course, that upon stopping of the engine, the switch will immediately open as a result of the spring 38 forcing the oil out of the chamber 35. Even though the engine may be immediately restarted, a time delay of 7 to 10 seconds will elapse before the switch will reclose.

It will be noted from Fig. 1 that the conductor 26 provides a shunt circuit around the ignition coil 19 for the spark plug 13, so that when the engine ignition switch 17 is closed, the resistance unit 21 and the engine ignition coil 30 are in series supplying current only to the engine ignition system. The purpose of the resistance unit 21 is to provide the desired current potential to the engine ignition coil 30, as previously stated. After the engine has started, the engine oil pressure will actuate the pressure switch 14 to cause the arm 24 to break with the contact 25 and engage the contact 27. This shunts out the resistance 21 and places both the engine ignition coil 30 and the muffler spark plug ignition coil 19 in series. The time interval between the starting of the engine and the energization of the spark plug 13 is determined in accordance with the time required for oil pressure to be communicated through the orifice 37c into the chamber 35 to actuate the microswitch 39b. As previously explained, the time-delay is preferably of the order of 7 to 10 seconds. This is sufficient to enable the exhaust gases discharging from the engine to purge any explosive gaseous mixture that may have accumulated in the muffler, and thus avoid the danger of explosion.

*The time delay being dependent upon the time required for oil flow through orifie 37c to reach the pressure for which spring 38 is set and to move 38d to actuate the switch 39b; that time delay is not, to any substantial or primary extent, controlled by the temperature of the engine, the exhaust line, or the muffler, or by heat derived in any manner from the engine.*

Figure 3:
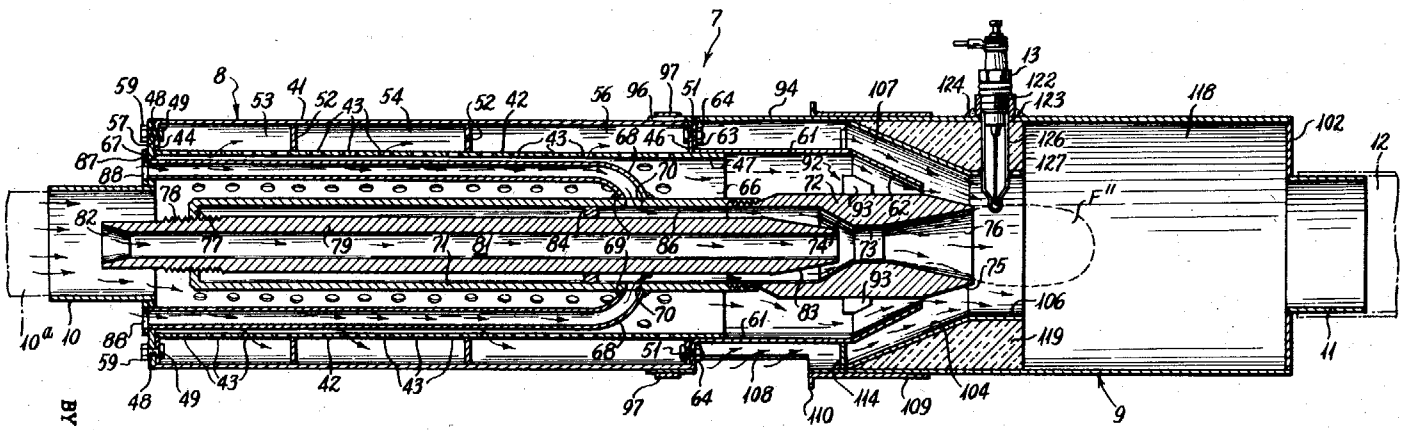
Fig. 3 is a longitudinal sectional view through the spark plug-equipped combined muffler and afterburner.

The foregoing will be more fully appreciated in light of the details of construction of the muffler device 7 best shown in Fig. 3 to which reference will now be made. Thus, the combination muffler and afterburner includes the cylindrical forwardly located muffler section 8 and the rearwardly located afterburner section 9 axially aligned and secured together in telescoped relation. The section 8 comprises a cylindrical sheet metal casing 41 and a cylindrical shell 42 provided with a plurality of perforations 43 mounted within the casing 41 in concentric relation therewith, the shell 42 extending slightly beyond the casing 41 at its rearward end. A spacer ring 44 is secured, as by welding, between the casing 41 and shell 42 at their forward ends and a spacer ring 46 is similarly secured between the rearward end of casing 41 and the portion of the outer surface of shell 42 in vertical alignment therewith leaving an unperforated cylindrical portion 47 of shell 43 extending beyond spacer ring 46.

A plurality of evenly spaced bolts 48 pass through apertures in ring 44 and are provided with enlarged head portions 49 which abut the inner face of spacer ring 44 to which they may be secured by welding. A plurality of bolts 51 are mounted on spacer ring 46 in a similar manner. Intermediate spacer rings 52 are secured between casing 41 and perforated shell 42 to provide compartments or dead air spaces 53, 54, and 56, which have a sound-deadening or muffling effect.

The forward end of section 8 is closed by an end plate 57 having a central opening in which inlet member 10 is mounted by welding or other suitable means for connection to the engine exhaust connection 10a shown in dot and dash lines. End plate 57 is detachably secured to section 8 by passing the bolts 48 through apertures therein and threading nuts 59 on said bolts.

The rearward end of section 8 is closed by a cylindrical member 61 having a conical end portion 62 provided with a central opening concentric with the opening in end plate 57. Cylindrical member 61 is proportioned so as to telescope over the end portion 47 of shell 42 and is provided with an attaching flange 63 detachably secured to spacer ring 46 by passing bolts 51 through apertures in said flange and threading nuts 64 on said bolts.

End plate 57, shell 42, and conical end portion 62 of cylindrical member 61 cooperate to form a chamber 66 which receives hot exhaust gas through the inlet 10. The end plate 57 is provided with a plurality of openings 67 in each of which is secured one end of a plurality of primary air conduits 68. Three such conduits may be present, but it is to be understood that the number and size of these conduits can be varied without departing from the principles of the invention, as they will vary with the size and requirements of a given muffler. The opposite ends of the conduits 68 are secured, as by welding 69 about openings 70, to a cylindrical tube 71 so that the tube 71 is concentrically mounted within the shell 42. Tube 71 is internally threaded at its rearward end to receive a nozzle member 72 including a cylindrical orifice 73 having a converging wall portion 74 and a flaring wall portion 76 on the opposite sides thereof. The nozzle member 72 extends a short distance beyond the conical portion 62 of cylindrical member 61 and the extending portion is provided with a converging wall portion 75.

The forward end of tube 71 is closed by an end wall 77, having a threaded central opening to receive a threaded portion 78 of a relatively thick walled tube 79 so as to concentrically mount the same with respect to the outer cylindrical tube 71. The tube 79 has a passageway 81 of uniform diameter extending therethrough and one end of tube 79 projects slightly into the inlet 10 and has a flared entrance 82 to receive a portion of the exhaust gases emerging from the exhaust connection 10a.

The tube 79 has a tapered rearward end portion 83 which terminates just short of the cylindrical orifice 73 in nozzle member 72 so as to confront the converging wall portion 74, and it is apparent that adjustments in the distance between the end of tube 79 and converging wall portion 74 may be made by screwing tube 79 in or out with respect to tube 71. A spacer ring 84 is located between tubes 71 and 79 just forward of the openings 70 and with the tubes 71 and 79 forms a chamber 86 to receive primary air from tubes 68 and direct it to nozzle 72 where it mixes with the exhaust gases segregated by tube 79 causing burning of the combustible materials therein to form a pilot flame F″.

The amount of primary air supplied is controlled by a damper plate 87 mounted on the end plate 57 and is provided with primary air inlets 88, one for each tube 68. The damper plate 87 is rotatable upon the inlet member 10 so that it can be angularly adjusted to control the amount of primary air that enters the conduits 68 through the openings 88. Suitable means may be provided to lock the damper plate 87 in any selected position of adjustment. It will be obvious that the primary air is drawn into the burner structure by the injector action of the gas stream at the orifice 73, in a volume substantially proportionate to the velocity of the gas stream.

The afterburner section 9 is provided with a diffuser 92 comprising a plurality of vanes 93 located at the point where the cylindrical member 61 merges into the conical end portion 62 and arranged at an angle of about 45° relative to the axis of the muffler to impart turbulence to the exhaust gases as they flow through chamber 66 toward the opening in the conical portion 62. Vanes 93 may be secured at one end as by welding to either the cylindrical member 61 or nozzle member 72, but not to both as there must be relative movement between these members to permit assembly of the parts.

Section 9 of the present form of muffler is provided with a cylindrical casing 94, the forward end of which may be split as shown at 96 so that after being telescoped over the rearward end of the casing 41 of section 8, it may be secured firmly in place by a conventional clamping ring 97, which is provided with a pair of ears 98. A bolt 99 extends through holes in the ears and receives a nut for tightening the ring 97 about the casing 94 as shown in Fig. 1.

Cylindrical casing 94 is provided with an end plate 102 having a central opening in which the outlet member 11 of relatively larger diameter than the inlet member 10 is mounted. Outlet member 11 serves as a means for connecting the muffler to the tail pipe 12, shown in dot and dash lines.

A frusto-conical member 104 is mounted in the casing 94 at a point such that when the casing 94 is clamped on the casing 41, the frusto-conical member is spaced a slight distance longitudinally of the conical end portion 62 of cylindrical member 61. Frusto-conical member 104 has a cylindrical extension 106 of substantially larger diameter than the adjacent open end of the conical end portion 62 of cylindrical member 61. The cylindrical extension 106 preferably begins at a point which will lie closely adjacent a vertical plane defined by the end of nozzle member 72 when the casing 94 is clamped on the casing 41.

Cylindrical member 61 and frusto-conical member 104 cooperate to form a chamber 107 for receiving secondary air entering through a large rectangular inlet opening 108 in the casing 94. The secondary air entering opening 108 may be conveniently regulated by a sleeve 109 slidably mounted on the casing 94 and provided with a flange 110 for enabling said sleeve to be easily shifted. Suitable means may be provided so that sleeve 109 may be firmly secured to adjusted position. As shown in Fig. 1, the sleeve 109 is provided with a pair of ears 111. Bolts 112 extend through apertures in the ears so that through cooperation with nuts 113, the sleeve 109 may be clamped tightly upon casing 94. It will be obvious that the secondary air is drawn into the burner structure by the injector action of the gas stream at 62, in a volume substantially proportionate to the velocity of the gas stream.

To provide for even distribution of the secondary air, baffle elements such as plate 114 may be suitably positioned at the inlet end of chamber 107. The secondary air passes through the chamber 107 to later mix with the unsegregated portion of the exhaust gas leaving the chamber 66 in a highly turbulent state after passing through the diffuser 92. Here the burnable material in the main body of the exhaust gas is ignited by the pilot flame F″ and burns in the main combustion chamber 118 of the afterburner which is formed between the frusto-conical member 104 and end plate 102. If desired, the space between frusto-conical member 104 and the casing 94 may be filled with insulating material 119 to prevent dissipation of heat and insure a maximum temperature in the region of the pilot flame F″.

To insure positive ignition of the burnable material in the exhaust gas, even under the most extreme conditions when the pilot flame F″ is not propagated by spontaneous combustion of the burnable material in the minor segregated portion of the exhaust gas which passes through the tube 79, the present combination muffler and afterburner is provided with the conventional igniter or spark plug 13. Spark plug 13 is mounted in the opening formed by the cylindrical extension 106 of the frusto-conical member 104 and for this purpose, an internally threaded sleeve 122 may be mounted about an opening 123 in cylindrical casing 94 and secured in place as by welding 124. The electrodes of the plug 13 pass through the opening 123 and the corresponding openings 126 in the insulating material 119 and 127 in the cylindrical extension 106.

Thus, it will be seen that while the muffler 7 is designed to, and is capable of, maintaining the pilot flame F″ for igniting unburned hydrocarbons in the exhaust gases under most operating conditions, positive assurance of substantially complete combustion of such constituents under all operating conditions is assured by the continuously operating spark plug 13.

It will also be appreciated that since the spark plug 13 is connected in circuit with the engine ignition system, its operation is automatically controlled when the engine is started and stopped, so that no spark is produced after the engine has stopped which might otherwise cause an accumulation of gases in the afterburner section to explode.

The damping device or dash pot 5 for controlling the carburetor throttle return has a peculiar advantage when used in combination with the afterburner muffler 7 disclosed herein, in that it not only results in a substantial savings in fuel (10 to 12%) and an increase in horsepower, but also prevents too rich a mixture of fuel with the exhaust gases from entering the afterburner section and being discharged to the atmosphere in unburned condition. As is well known, when the accelerator pedal is suddenly released, and the engine decelerates, a substantial volume of fuel is drawn into the cylinders and is discharged in unburned condition with the exhaust gases. This results in air pollution for the reason that the exhaust gases then contain a greater portion of unburned hydrocarbons than can be burned in the afterburner section in the short interval of time that the gases remain therein. According to the present invention, the damping device 5 prevents the foregoing condition from occurring and thus increases the efficiency of the muffler device, enabling the same to discharge exhaust gases in which substantially no unburned hydrocarbons are present.

The foregoing is significant in that tests have shown that, while some saving of fuel is accomplished through use of the present muffler due to reduced engine back pressure, the saving is negligible compared to that gained by using the dashpot 5 in combination with the afterburner muffler 7. Again, the use of the dashpot 5 on the same vehicle equipped with a conventional muffler effected no substantial saving in fuel. The explanation for the phenomenon is unknown, but the results stated are based upon actual tests.

It will be understood that various changes may be made in the details of construction of the pressure-responsive switch and in the circuit for controlling the afterburner spark plug, without departing from the principles of the invention or the scope of the annexed claims.

I claim:

1. In combination: an internal combination engine; a burner structure connected with said engine to take the exhaust gases therefrom; a spark plug mounted in said burner structure for igniting unburned exhaust gases in said burner structure; circuit means for energizing said spark plug; and means operating in said circuit means for preventing energization thereof until after the engine has been in operation for a predetermined time interval.

2. In combination: an internal combustion engine; a burner structure connected with said engine to take the exhaust gases therefrom; a spark plug mounted in said burner structure for igniting unburned exhaust gases in said burner structure; circuit means for energizing said spark plug; and a time-delay switch mechanism connected in said circuit means for delaying energization thereof until a predetermined time interval has elapsed after starting of said engine.

3. In combination: an internal combustion engine having a high pressure oil lubricating system; a burner structure connected with said engine to take the exhaust gases therefrom; an electrical circuit including an ignition coil and a spark plug connected in circuit with said coil, said spark plug being mounted in said burner structure for igniting unburned exhaust gases in said burner structure; and a switch in said circuit responsive to a given engine oil pressure for completing the circuit to said ignition coil to thereby control energization of said spark plug.

4. The combination defined in claim 2, in which the switch mechanism includes a time-delay device actuatable by the engine oil pressure for delaying closing of said switch until after said oil pressure has reached said given pressure.

5. In combination: an internal combustion engine having a high pressure oil lubricating system; a burner structure connected with said engine to take the exhaust gases therefrom; an electrical circuit including an ignition coil and a spark plug connected with said coil, said spark plug being mounted in said burner structure for igniting unburned exhaust gases in said burner structure; a pressure-responsive switch in said circuit including a pressure chamber; and means connecting said pressure chamber with the engine lubricating system for communicating pressure to said switch to actuate the same to complete the circuit to the ignition coil to thereby control energization of said spark plug.

6. In combination: an internal combustion engine having a high pressure oil lubricating system; a burner structure connected with said engine to take the exhaust gases therefrom; an electrical circuit including a spark plug mounted in said burner structure for igniting unburned exhaust gases in said burner structure; an ignition coil for said spark plug and an engine ignition coil connected in series in said circuit with said spark plug ignition coil; and a pressure-responsive switch connected in circuit with said burner structure ignition coil and operable only in response to a predetermined oil pressure in said lubricating system for completing the circuit to said spark plug ignition coil to effect energization thereof.

7. In combination: an internal combustion engine having a high pressure oil lubricating system; a burner structure connected with said engine to take the exhaust gases therefrom; an electrical circuit including a spark plug mounted in said burner structure for igniting unburned exhaust gases in said burner structure; a resistance, a spark plug ignition coil and an engine ignition coil all connected in series in said circuit; a shunt circuit connected around said spark plug ignition coil and including a pressure-responsive switch, which when in circuit-closing position cuts out said spark plug ignition coil; and a second shunt circuit around said resistance to said switch and closable by said switch when in an alternative position thereof for cutting out said resistance, said switch being automatically operable by pressure derived from said lubricating system and being actuatable from the position in which it shunts out the spark plug ignition coil to prevent energization of said spark plug to a position in which it shunts out the resistance and energizes said spark plug when the pressure in said switch reaches a predetermined value.

8. The combination defined in claim 1, in which the engine has a high pressure oil lubricating system, and including means responsive to a given engine oil pressure and acting to actuate the said means operating in said circuit means.

9. In combination: an internal combustion engine having a high pressure oil lubricating system; a burner structure connected with said engine to take the exhaust gases therefrom; a spark plug in said burner structure for igniting unburned exhaust gases therein; and means responsive to a given engine oil pressure for energizing said spark plug.

*10. The combination defined in claim 1, and in which the operation of the prevention means operating in said circuit means is at least primarily independent of the temperature of the engine and of heat derived therefrom.*

*11. The combination defined in claim 2, and in which the operaton of the time-delay switch mechanism is at least primarily independent of the temperature of the engine and of heat derived therefrom.*

References Cited in the file of this patent or the original patent

UNITED STATES PATENTS

| | | |
|---|---|---|
| 1,934,596 | Fogas | Nov. 7, 1933 |
| 2,019,172 | Chandler | Oct. 29, 1935 |